United States Patent
Wendt et al.

[11] Patent Number: 5,307,407
[45] Date of Patent: Apr. 26, 1994

[54] 20 HZ RING GENERATOR USING HIGH FREQUENCY PWM CONTROL

[75] Inventors: Rolf H. G. Wendt, Beaverton; Steven E. Hossner, Hillsboro, both of Oreg.

[73] Assignee: Nec America, Inc., Melville, N.Y.

[21] Appl. No.: 808,873

[22] Filed: Dec. 19, 1991

[51] Int. Cl.⁵ .............................................. H04M 3/02
[52] U.S. Cl. ................................... 379/418; 379/253; 379/413
[58] Field of Search ................ 379/418, 251, 252, 253, 379/413; 307/261, 268; 328/113, 223

[56] References Cited

U.S. PATENT DOCUMENTS

| | | |
|---|---|---|
| 4,015,091 | 3/1977 | Rao et al. |
| 4,220,826 | 9/1980 | Kiss |
| 4,239,935 | 12/1980 | Bosik et al. |
| 4,250,455 | 2/1981 | Davis ........................ 307/261 X |
| 4,340,785 | 7/1982 | Awadalla |
| 4,349,703 | 9/1982 | Chea, Jr. |
| 4,500,844 | 2/1985 | Lisco |
| 4,631,361 | 12/1986 | Miller |
| 4,656,659 | 4/1987 | Chea, Jr. .......................... 379/253 |
| 4,734,936 | 3/1988 | Tanaka et al. ................... 379/253 |
| 4,866,587 | 9/1989 | Wadlington ................. 379/418 X |
| 4,964,158 | 10/1990 | Okochi et al. |

Primary Examiner—James L. Dwyer
Assistant Examiner—Paul Fournier
Attorney, Agent, or Firm—Sughrue, Mion, Zinn, Macpeak & Seas

[57] ABSTRACT

A low frequency high voltage AC power for a telephone system is provided by a ring signal generator, which produces a ring signal from a DC power supply using a pair of switches controlled by pulse width modulation (PWM) circuit. The ring signal generator includes a PWM circuit driving a pair of MOSFET transistors via a respective pair of opto-isolators. The output of the MOSFET transistor switches is commonly connected to a low pass filter network. The ring signal generator of the present invention advantageously produces a 65 VRMS ring signal at very high efficiency.

20 Claims, 4 Drawing Sheets

20 HZ RING GENERATOR USING HIGH FREQUENCY PWM CONTROL

FIELD OF THE INVENTION

The present invention relates generally to a ring signal generator. More specifically, the present invention relates to a ring signal generator employing a high frequency pulse width modulation circuit to control a plurality of switches connected to high voltage DC rails to produce a low frequency, high voltage AC ring signal. The pulse width modulation circuit is advantageously coupled to the switches via opto-isolator elements.

BACKGROUND OF THE INVENTION

Ring signal generators generally fall into one of two classes. The first class uses a step up transformer to convert a low voltage, high current signal to a high voltage ring signal. The second class includes generators which use a high voltage external power supply as an input voltage source. Pulse width modulators or comparable devices are often employed in both classes of ring signal generators.

The first class of ring signal generator is shown by exemplary U.S. Pat. No. 4,220,826, which discloses a ring generator employing a variable pulse width modulator controlling a driver circuit. The output of the driver circuit controls a switch connected to the primary of a step up transformer. The output of the transformer's secondary winding is rectified and output through a pair of switches to produce an AC ring signal. A comparator is employed to develop an error signal which is used to control the output frequency of the pulse width modulator by controlling the duty cycle. On the other hand, U.S. Pat. No. 4,964,158 discloses a power supply for a telephone exchange employing an extremely small output power transformer while U.S. Pat. No. 4,015,091 discloses a telephone ring generator using a DC-to-DC converter controlled by an oscillator. The oscillator in the latter patent is switched between ON and OFF states by a pair of transistors, thereby controlling the output of the converter to provide 20 Hz power to the ringer.

The second class of ring signal generators is illustrated by exemplary U.S. Pat. No. 4,349,703, which discloses a programmable ring signal generator including a pulse width modulator driving a commutator switch via a pulse limiter and a DC-to-DC converter. Power to drive the ringer is provided by the commutator switch. Another example is found in U.S. Pat. No. 4,500,844, which discloses a ring signal generator employing delta modulation to generate ring signals with positive and negative offsets simultaneously. Delta modulated power amplifiers are used in the latter patent to produce the 240 volts peak-to-peak ring reference signals.

Other types of ring signal generators are disclosed in U.S. Pat. Nos. 4,239,935, 4,340,785 and 4,631,361. U.S. Pat. No. 4,239,935, for example, discloses a ring signal generator employing a trapezoidal waveform, the shape of which is controlled by a capacitor and two constant current sources. A voltage supply producing 200 volts is connected as the ring signal power source. On the other hand, U.S. Pat. No. 4,340,785 discloses a ring signal supply receiving a low level reference signal from a remote location, which is used to control the output of an inverter coupled to a low pass filter. U.S. Pat. No. 4,631,361 discloses a ring generator which programmably produces DC and AC ring reference signals. The AC and DC signals can be specified independently. In particular, the ring generator employs a power switching amplifier controlled by a microcomputer.

Ring signal generators employing transformers, such as those described above, make it difficult to reduce the overall package size of the device. On the other hand, ring signal generators, such as those discussed in connection with the second class, employ devices which generally produce large amounts of heat, making it difficult to reduce the overall package size because heat sinks and similar devices must be included in the device.

The present invention was motivated by a desire to produce a ring signal generator which is small in size and high in efficiency.

SUMMARY OF THE INVENTION

The principal object of the present invention is to provide an improved ring signal generator which operates at a high overall efficiency.

Another object of the present invention is to provide a ring signal generator which is small in size.

Still another object of the present invention is provide a ring signal generator producing substantially less heat than conventional ring signal generators. According to one aspect of the present invention, a ring signal generator occupying a small amount of real estate can be provided without including large heat dissipative devices to compensate for increased heat density resulting from the size reduction of the ring signal generator. In summary, the ring signal generator according to the present invention advantageously can be provided in a smaller volume than that used by a conventional ring signal generator.

These and other objects, features and advantages of the present invention are provided by a ring signal generator producing a high voltage sinusoidal waveform at a predetermined frequency from first and second rails providing high DC voltages of opposite polarity. The ring signal generator includes first and second switch elements commonly connected to a low pass filter and connected to the first and second rails, respectively, first and second opto-isolators coupled to the first and second switch elements, respectively, so as to allow operation of the first and second switch elements responsive to first and second pulse modulated signals transmitted by respective first and second opto-isolators, first and second comparators respectively coupled to the first and second opto-isolators generating the first and second pulse modulated signals, respectively, based on an error signal and a second signal, wherein the operating frequency of the second signal is significantly higher than the frequency of the error signal and wherein the error signal is based on a difference between a reference signal having a frequency substantially equal to the frequency of the error signal and a feedback signal corresponding to an output signal of the low pass filter. According to one aspect of the invention, the first and second switch elements are MOSFET power transistors.

These and other objects, features and advantages of the present invention are provided by a ring signal generator including a pulse width modulation circuit connected to receive an error corrected reference signal, which is based on a reference signal and an output signal, and a second signal having a frequency significantly higher than a frequency of the error corrected reference signal and to generate first and second pulse modulated signals, the first pulse modulated signal being generated when the amplitude of the error corrected reference signal is greater than the second signal and the second pulse modulated signal being generated when the amplitude of the second signal is greater than the amplitude of the error corrected reference signal. First and second transistors and first and second opto-isolators, respectively, are serially coupled to the pulse width modulation circuit so that respective gates of the first and second transistors receive respective first and second pulse modulated signals. The ring signal generator further comprises a filter network to which the drain terminals of the first and second transistors are connected. The ring signal generator is characterized in that respective ones of the first and second rails and source terminals of the first and second transistors are connected to permit the first and second transistors to generate an unfiltered output signal at a second predetermined frequency responsive to application of the first and second pulse modulated signals to respective gates of the first and second transistors. The filter network generates the output signal in response to the unfiltered output signal.

According to another aspect of the present invention, the pulse width modulated signals are constrained such that the first and second transistors cannot both be on at the same time, thus preventing a short circuit between the first and second rails. According to this aspect of the invention, the error corrected reference signal is employed to generate first and second error corrected reference signals which are at different DC offsets with respect to each other. The leading and trailing edges of respective first and second pulse width modulated signals generated in response to the first and second error corrected reference signals are separated from one another by a dead band.

These and other objects, features and advantages of the invention are disclosed in, or apparent, from the following description of preferred embodiments.

BRIEF DESCRIPTION OF THE DRAWINGS

The preferred embodiments are described with reference to the drawings, in which like elements are denoted throughout by like or similar numbers, and in which.

DESCRIPTION OF THE PREFERRED EMBODIMENTS

Figure 1:
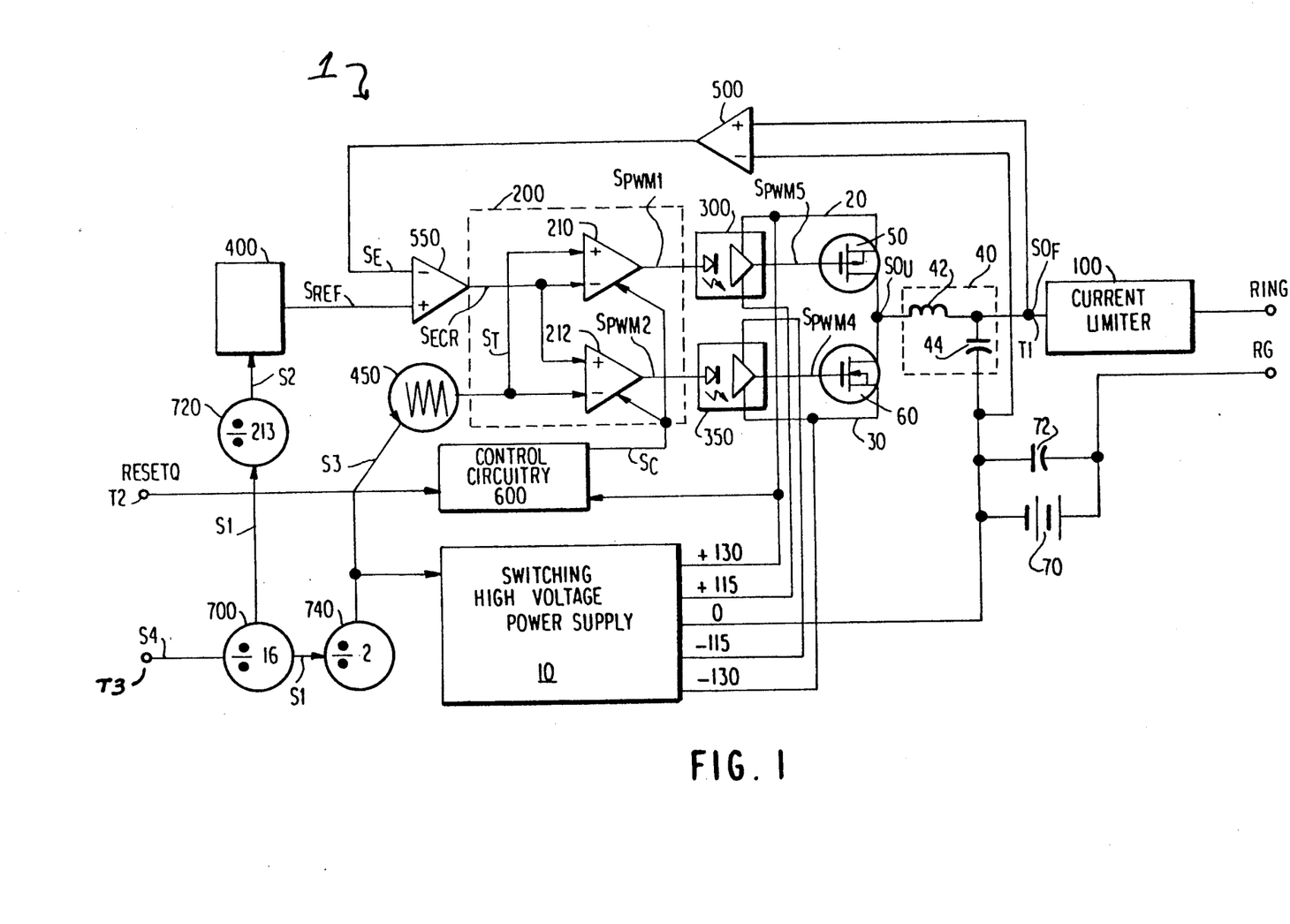
FIG. 1 is a schematic diagram including high level function blocks of a ring signal generator according to the present invention.

A ring signal generator 1 according to a preferred embodiment of the present invention is shown in FIG. 1 and includes a power supply 10 providing power to an output terminal T1 via first and second rails 20 and 30, which are alternatively connected to a filter 40 by a pair of switches 50 and 60. Power supply 10 advantageously can be a switching high voltage power supply producing at least two voltages of opposite polarity. Preferably, power supply 10 provides two pairs of output voltages, wherein each pair of output voltages have equal magnitudes and opposite polarities. Most preferably, power supply 10 provides output voltages of about 130 VDC, −130 VDC, 115 VDC, −115 VDC. Power supply 10 advantageously can include an output terminal maintained at ground potential.

Preferably, switches 50 and 60 are transistor switches wherein each of the transistors has a first terminal connected to a respective one of the rails 20, 30 and a second terminal connected to an input terminal of filter 40. The third terminal of each switch 50, 60 is advantageously connected so as to receive a pulse width modulated signal, as discussed in greater detail below. Most preferably, switches 50, 60 are high voltage MOSFET transistors with transistor 50 being a p-channel type transistor and transistor 60 being a n-channel type transistor.

From the discussion thus far, it will be appreciated that the operation of switches 50, 60 produces an unfiltered output signal $SO_U$ at the input terminal of filter 40. Filter 40 advantageously comprises an inductor 42 and a capacitor 44 which, in turn, comprise a low pass filter. Thus, filter 40 generates a filtered output signal $SO_F$, which is provided to terminal T1.

The filtered output signal $SO_F$ at terminal T1 is provided to an output terminal RING via a serially connected current limiter circuit 100. A biasing voltage is provided to another output terminal RG by means of a power source 70, which is connected in parallel with a capacitor 72 acting as a high pass filter. It will be apparent that the output of generator 1 at terminal RING is biased by the voltage applied to terminal RG by power source 70. Preferably, power source 70 provides 48 VDC so that the output of generator 1 across terminals RING and RG is about 65 volts RMS superimposed upon 48 VDC.

Ring signal generator 1 also includes a pulse width modulation (PWM) circuit 200 for producing first and second pulse modulated signals $S_{PWM1}$ and $S_{PWM2}$, which signals are advantageously provided to respective ones for the switches 50, 60 via a pair of opto-isolators 300 and 350. Preferably, opto-isolators 300, 350 are serially coupled to respective third terminals of switches 50, 60. PWM circuit 200 advantageously includes first and second comparators 210 and 212, each having positive and negative input terminals and an output terminal. Preferably, the output terminals of comparators 210, 212 are coupled to input terminals of respective opto-isolators 300 and 350. Preferably, PWM circuit 200 also includes first and second input terminals, which are connected to positive and negative input terminals of comparators 210, 212, as described in greater detail below. The first input terminal of PWM circuit 200 advantageously is coupled so as to receive a signal based on a reference signal $S_{REF}$ generated by a first signal generator 400 while the second input terminal of PWM circuit 200 is connected to receive a high frequency signal from a second signal generator 450. Preferably, the reference signal generated by signal generator 400 is a low frequency sinusoidal signal, which advantageously can be a 20 Hertz (Hz) sine wave. The second signal generated by signal generator 450 advantageously can be a high frequency signal, which, in an exemplary case, can be a 64 kilohertz (KHz) triangular waveform.

Ring signal generator 1 advantageously includes a feedback or error correcting loop for determining errors in the filtered output signal at terminal T1. A first differential amplifier 500 advantageously can be connected across capacitor 44 in filter 40 to provide a feedback signal corresponding to the filtered output signal $SO_F$ at terminal T1. A second differential amplifier 550 advantageously can be serially connected between the output terminal of signal generator 400 and the first input terminal of PWM circuit 200. Preferably, the feedback signal is provided to the negative input terminal of amplifier 550 while the reference signal $S_{REF}$ is provided to the positive input terminal of amplifier 550, which advantageously produces an error corrected reference signal $S_{ECR}$ supplied to the first input terminal of PWM circuit 200.

Ring signal generator 1 also includes a control circuit 600, which includes first and second input terminals, which advantageously are connected to an input terminal T2 of ring signal generator 1 and rail 20 respectively. Preferably, an output terminal of circuit 600 is connected to PWM circuit 200. Control circuit 600 advantageously provides a control signal $S_C$ for inhibiting the operation of PWM circuit 200 in response to a reset signal RESETQ applied to terminal T2 or a fault condition on rail 20.

First, second and third frequency dividers 700, 720 and 740, respectively, are advantageously provided for generating signals S1, S2 and S3 in response to a high frequency signal S4 provided at an input terminal T3 of generator 1. Preferably, signal S4 is a 2.048 megahertz (MHz) signal. Frequency divider 700, which advantageously includes an input terminal connected to terminal T3, converts signal S4 to signal S1 which is then provided to frequency dividers 720 and 740. Signal S2, which is produced by converting signal S1 in frequency divider 720, advantageously is provided to first generator 400. Signal S3, which is produced by frequency divider 740, advantageously is provided to both power supply 10 and second generator 450. Preferably, signal S1 is about 128 Khz, signal S2 is about 600 Hz and signal S3 is about 64 KHz.

Figure 2A:
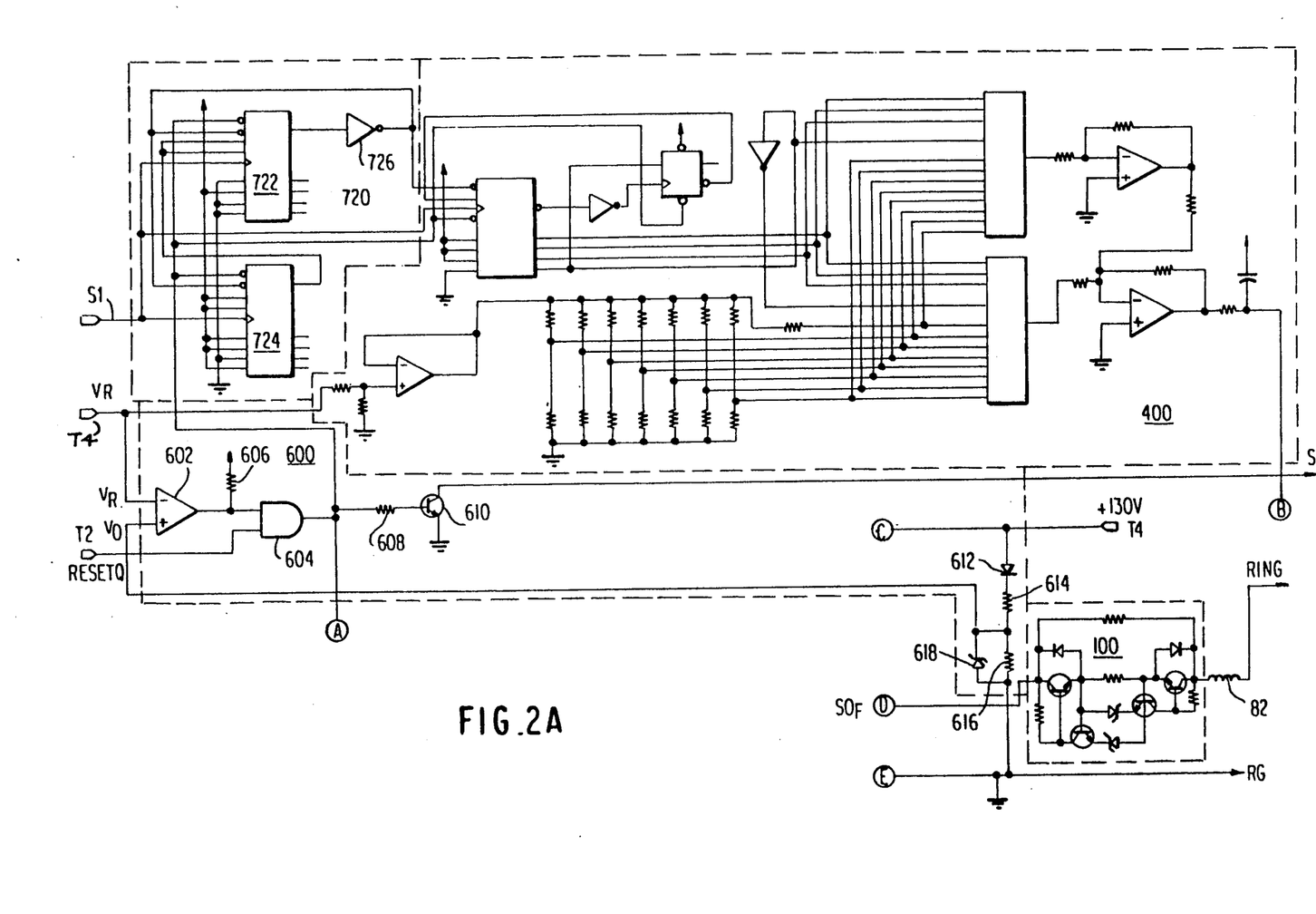
FIGS. 2A and 2B form a schematic diagram of selected portions of the invention shown in FIG. 1.
Figure 2B:
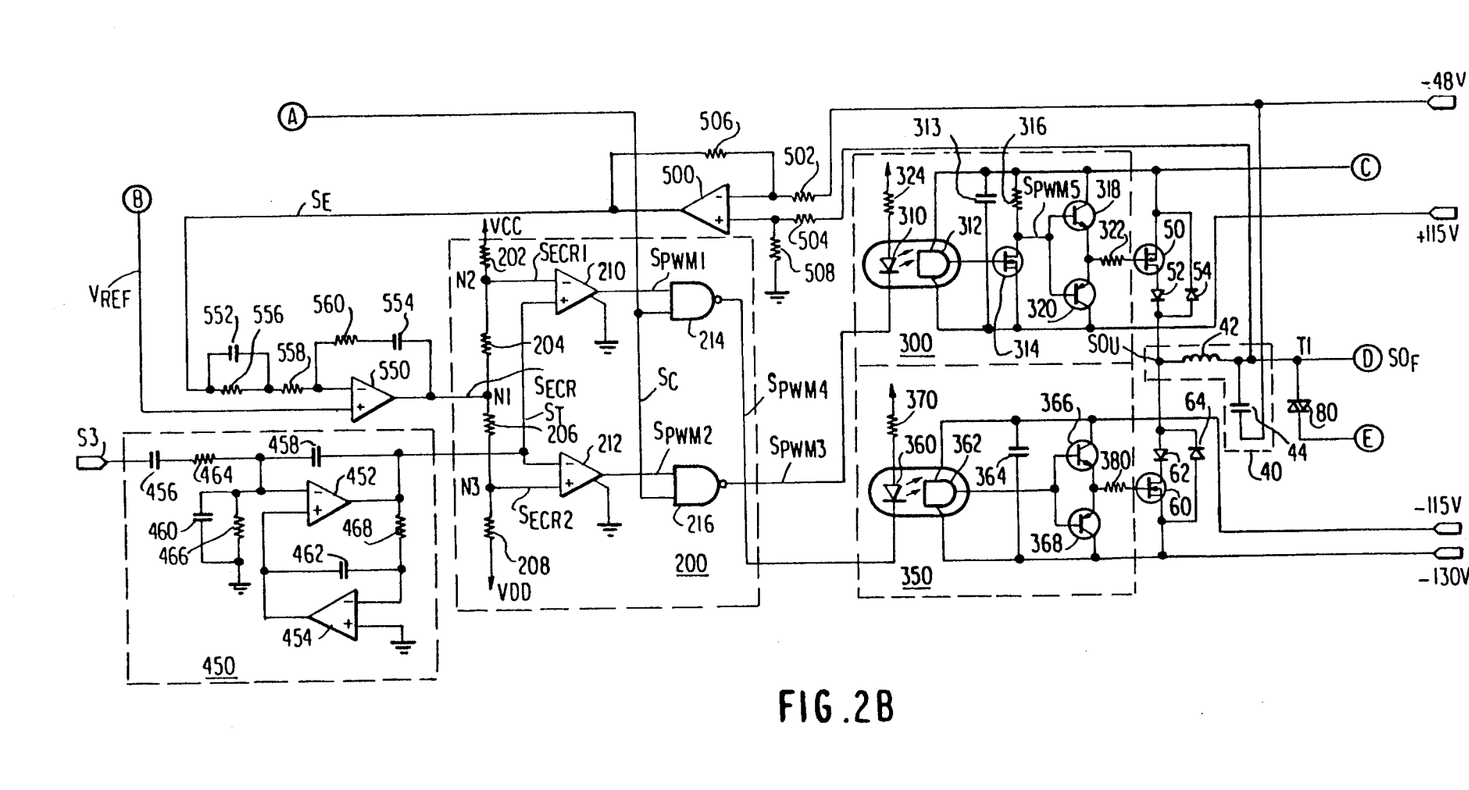

The operation of ring signal generator 1 will now be described while referring to FIGS. 2A and 2B, wherein selected portions of the ring signal generator 1 illustrated in FIGS. 2A and 2B are shown in schematic form. Additionally, reference to the waveforms of FIGS. 3A–3D will be made to illustrate the operation of PWM circuit 200 and opto-isolators 300, 350. It should be noted that detailed descriptions of elements or circuits, for example, power supply 10, which are well known to those of ordinary skill in the art, will be minimized in the interest of brevity.

Operation of ring signal generator 1 begins by setting signal RESETQ applied to terminal T2 low, which applies a low logic level to one input of AND gate 604, which is located in control circuit 600. Another input of AND gate 604 is provided by the logical output of comparator 602, which advantageously compares a voltage $V_O$ corresponding to the magnitude of the output voltage of power supply 10 with a reference voltage $V_R$ applied at an input terminal T4. It will be apparent that voltage $V_O$ is generated by a voltage divider network including resistors 614 and 616. This voltage divider network advantageously includes diode 612 and zener diode 618, which provide protective functions to prevent damage to comparator 602. The output of AND gate 604, which is a logical zero, is applied to NAND gates 214 and 216, whose function will be discussed in greater detail below with respect to PWM circuit 200. The low logic level control signal $S_C$ advantageously is applied to terminals in components included in first generator 400 and frequency divider 720 to reset those circuits to a predetermined value.

As discussed above, a signal S4 is converted by frequency dividers 700, 720 and 740 into signals S1, S2 and S3, respectively. As shown in FIG. 2A, signal S1 is applied to the input terminal of frequency divider 720, which advantageously includes cascade connected counters 722 and 724 which function to divide the frequency of signal S1 by a predetermined value so as to produce signal S2, in a manner well understood by those of ordinary skill in the art. The output of counters 722, 724 is provided to first generator 400 via an inverter 726 as signal S2. As mentioned above, signal S1 advantageously is 128 KHz while signal S2 preferably is 600 Hz.

Preferably, first generator 400 generates the low frequency reference signal $S_{REF}$ when signal S2 is applied to its input terminal. Reference signal $S_{REF}$ advantageously can be a 20 Hz sine wave. It will be noted that reference signal $S_{REF}$ is generated with an initial value of zero in response to signal RESETQ. Preferably, first generator 400 comprises a programmable sine wave reference generator, such as that disclosed in commonly assigned co-pending U.S. patent application Ser. No. 07/808,876, which is U.S. Pat. No. 5,180,987, which is incorporated herein by reference for all purposes. It will also be noted that conventional sine wave generators can be used to provide the function of first generator 400.

The reference signal $S_{REF}$ generated by first generator 400 is provided to the positive input terminal of amplifier 550. For the moment, the generation of an error signal $S_E$, which is applied to the negative input terminal of amplifier 550, will be ignored; it will simply be assumed that the output of amplifier 550 is error corrected reference signal $S_{ECR}$, which is applied to a first input terminal of PWM circuit 200.

Signal S3, which advantageously is generated by frequency dividers 700 and 740, is applied to the input terminal of second generator 450. Preferably, generator 450 is a triangular wave generator producing a triangular wave $S_T$ at the frequency of applied signal S3. Generator 450 advantageously includes a pair of amplifiers 452 and 454, capacitors 456, 458, 460 and 462 and resistors 464, 466 and 468, which are connected as shown in FIG. 2B. It will be appreciated that amplifier 452 integrates the signal S3 under the control of amplifier 454. The operation of triangular wave generators is well understood by those of ordinary skill in the art and further detailed discussion of the operation of second generator 450 will not be provided. Signal $S_T$ advantageously is provided to a second input terminal of PWM circuit 200.

PWM circuit 200 includes comparators 210 and 212, which advantageously are configured to receive both signals $S_{ECR}$ and $S_T$. Signal $S_{ECR}$ is applied to a node N1 of a voltage divider network including serially connected resistors 202, 204, 206 and 208. This voltage divider network provides first and second error corrected reference signals $S_{ECR1}$ and $S_{ECR2}$ to comparators 210 and 212 via nodes N2 and N3, respectively. Comparators 210 and 212 advantageously are also provided with signal $S_T$. From FIG. 2B it will be apparent that comparator 210 receives signal $S_{ECR1}$ on its negative input terminal and signal $S_T$ on its positive input terminal. It will also be noted that comparator 212 receives signal $S_T$ on its negative input terminal and signal $S_{ECR2}$ on its positive input terminal.

Figures 3A, 3B:
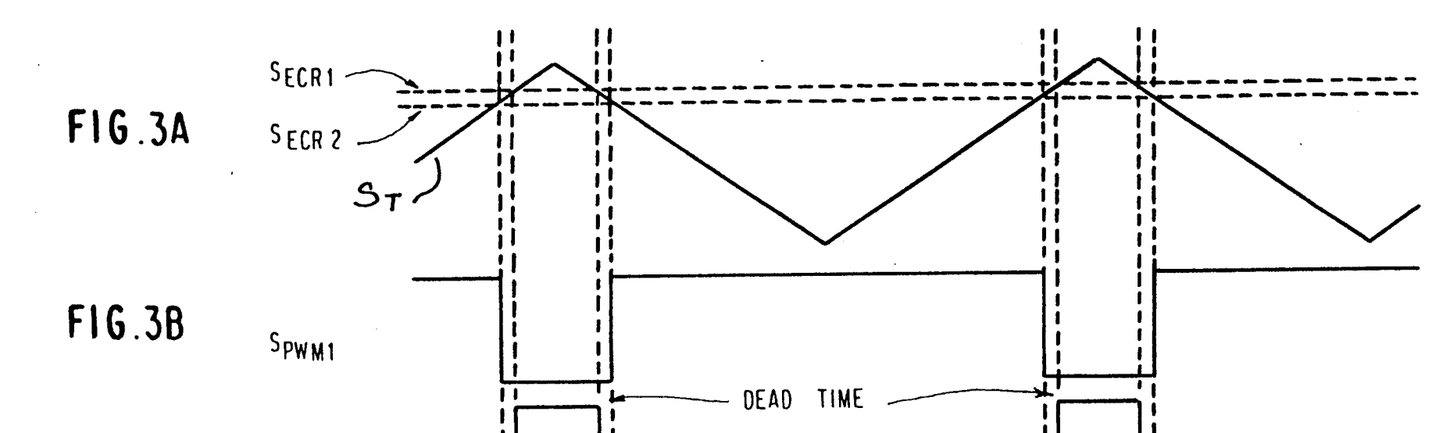
FIGS. 3A through 3D are waveforms used in explaining the operation of the invention of FIGS. 1, 2A and 2B.
Figure 3C:
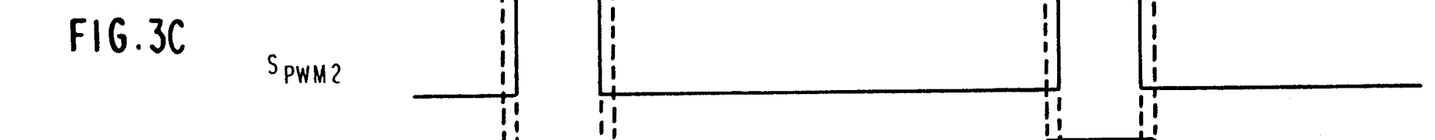
Figure 3D:
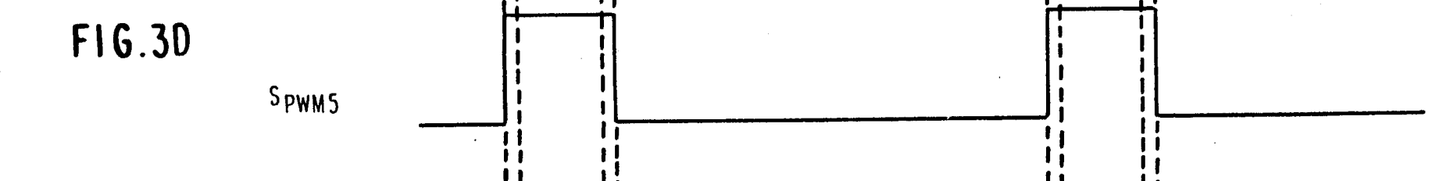

The operation of PWM circuit 200 will now be explained while referring to FIGS. 2A, 2B and 3A–3D. In FIG. 3A, signals $S_T$, $S_{ECR1}$ and $S_{ECR2}$ are illustrated. It will be noted that although signals $S_{ECR1}$ and $S_{ECR2}$ are sine waves, the difference in frequency between these signals and signal $S_T$, i.e., 20 Hz and 64 KHz, respectively, causes signals $S_{ECR1}$ and $S_{ECR2}$ to appear as constant values during the small number of cycles of signal $S_T$ illustrated in FIG. 3A. It will also be apparent that signals $S_{ECR1}$ and $S_{ECR2}$ advantageously are offset from one another in the vertical direction by the voltage divider network included in PWM circuit 200. As shown in FIG. 3B, comparator 210 outputs a negative logic level signal when the level of signal $S_{ECR1}$ is less than the level of signal $S_T$ and vice versa. As shown in FIG. 3C, comparator 212 generates a negative logic level signal when signal $S_T$ is less than signal $S_{ECR2}$, and vice versa.

Referring again to FIGS. 2A and 2B, the logic level signals generated by comparators 210 and 212, hereafter referred to as first and second pulse width modulated signals $S_{PWM1}$ and $S_{PWM2}$, respectively, are provided to a respective one of NAND gates 214 and 216. As discussed above, one input terminal of each NAND gate 214, 216 is held at a low logic level by control circuit 600. It will be apparent that signals $S_{PWM1}$ and $S_{PWM2}$ are transmitted and inverted by NAND gates 514 and 516 to produce inverted signals $S_{PWM3}$ and $S_{PWM4}$, respectively.

Signals $S_{PWM3}$ and $S_{PWM4}$ output by NAND gates 214 and 216 advantageously are applied to input terminals of opto-isolators 300 and 350. Preferably opto-isolators 300, 350 include a light emitting diode (LED) optically coupled to a photodetector. Preferably, opto-isolator 300 includes a LED 310, which is biased by a resistor 324, optically coupled to a photodetector 312. Photodetector 312 advantageously is connected to a transistor 314 biased by resistor 316. A capacitor 313 advantageously can be provided to decouple circuit elements 312, 314. Transistor 314, which advantageously is a N channel transistor, provides an inverting function for inverting the signal output by photodetector 312 to produce an inverted signal $S_{PWM5}$. The output of transistor 314 is supplied to a pair of transistors 318, 320 which preferably are connected to form an emitter-follower pair of transistors having a common output to a resistor 322. It will be appreciated that transistors 318, 320 amplify the signal $S_{PWM5}$ output by transistor 314, which signal is output by resistor 322 and advantageously is applied to the gate terminal of transistor 50, the operation of which is discussed in greater detail below.

Opto-isolator 350 is constructed in a similar manner but for the absence of a transistor used as an invertor. For this reason, the output of resistor 322 in opto-isolator 300 has the shape illustrated in FIG. 3B while the output of resistor 380 in opto-isolator 350 has a shape illustrated in FIG. 3D.

Signals $S_{PWM5}$ and $S_{PWM4}$ are applied to respective gate terminals of transistors 50 and 60 for controlling the switching operation of these transistors. It will be apparent that, when the signal $S_{PMW5}$ at the gate of transistor 50 is low, transistor 50 is in the ON state. It will also be apparent that, when signal $S_{PWM4}$ is high, transistor 60 is ON. The outputs of transistors 50, 60 are collectively applied to the input terminal of filter 40 as unfiltered output signal $SO_U$. The output of filter 40 is a filtered signal $SO_F$ applied to terminal T1.

It will be appreciated that signals $S_{PWM5}$ and $S_{PWM4}$ are constrained such that transistors 50 and 60 cannot both be on at the same time, thus preventing a short circuit between rails 20 and 30. Signals $S_{ECR1}$ and $S_{ECR2}$, which, as discussed above, are different in DC offset with respect to each other, are used in generating $S_{PWM1}$ and $S_{PWM2}$, respectively, which have pulse widths which differ from one anther by a small amount. The leading and trailing edges of signals $S_{PWM5}$ and $S_{PWM4}$, which result for double and single inversions of signals $S_{PWM1}$ and $S_{PWM2}$, respectively, are separated from one another by a dead band, which advantageously prevents transistors 50 and 60 from being in the ON state simultaneously.

It will be appreciated that the output signal $SO_F$ at terminal T1 has a frequency substantially equal to the frequency of signal $S_{REF}$ applied at amplifier 550. However, in order to positively control the frequency and amplitude of the output signal $SO_F$, a feedback circuit is required. Ring signal generator 1 advantageously includes a differential amplifier 500 having negative and positive terminals connected across capacitor 44 via resistors 502 and 504, respectively, for providing an error signal to differential amplifier 550. Amplifier 500 advantageously includes a resistor 506 providing negative feedback, as well as a pull-up resistor 508 connected to the positive input terminal. The output of amplifier 500 is supplied to the negative input terminal of amplifier 550 as error signal $S_E$. As shown in FIG. 2B, amplifier 550 advantageously is provided with a feedback compensation network including capacitors 552 and 554 and resistors 556, 558 and 560 coupled to its negative input terminal. It will be appreciated that the feedback compensation network for amplifier 550 provides phase adjustment and feedback stability for ring generator 1.

As discussed above, the error signal $S_E$ is input to the negative input terminal of differential amplifier 550, which also receives the reference signal $S_{REF}$ from first generator 400. It will be apparent that the feedback signal, i.e., signal SE, advantageously controls the signal $S_{ECR}$ applied to the first input terminal of PWM circuit 200 to control the output frequency of the unfiltered output signal $SO_U$.

Preferably terminal T1 is serially connected to terminal RING via current limiter 100. Current limiter 100 advantageously is the current limiter disclosed in commonly-assigned co-pending U.S. patent application Ser. No. 07/808,875, which is incorporated herein by reference for all purposes. Further discussion of current limiter 100 will not be provided in this application.

Ring signal generator 1 includes a plurality of protective elements protecting generator 1 from external and internal transients. For example, a varistor 80 is connected between terminal T1 and ground to protect against external voltage transients. It will also be appreciated that diode pairs of 52, 54 and 62, 64 which are advantageously coupled to transistors 50 and 60, protect transistors 50, 60 from an inductive kick produced by inductor 40. Another inductor 82 advantageously is connected between the output terminal of current limiter 100 and terminal RING to limit current surges in this portion of the circuit.

The control circuit 600 advantageously includes a transistor 610 connected to the output of AND gate 604 via resistor 608. Transistor 610 provides a signal $S_F$ indicative of ring signal generator 1 failure. Preferably, transistor 610 is turned on when the magnitude of one of the voltages generated by power supply 10 falls below a predetermined minimum level.

It will be appreciated that the ring signal generator described above includes a power supply 10 and a plurality of high speed switching devices. Ring signal generator 1 advantageously can be fabricated using high efficiency components throughout, to thereby produce a ring signal generator whose efficiency is limited primarily by the efficiency of power supply 10.

It will also be appreciated that the various components are thermally efficient. In other words, the real estate devoted to ring signal generator 1 can be reduced since heat sinks and other dissipative devices are not required. Therefore, the ring signal generator can be made small in size without increasing the heat per square produced by the ring signal generator.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A ring signal generator producing a high voltage sinusoidal waveform at a predetermined frequency from first and second rails providing high DC voltages of opposite polarity, said ring signal generator comprising:
   first and second switch elements commonly connected to a low pass filter and connected to the first and second rails, respectively;
   first and second opto-isolators coupled to said first and second switch elements, respectively, for allowing operation of said first and second switch elements responsive to first and second pulse modulated signals transmitted by said first and second opto-isolators, respectively;
   first and second comparators respectively coupled to said first and second opto-isolators for generating said first and second pulse modulated signals, respectively, based on an error signal and a second signal, wherein the operating frequency of said second signal is significantly higher than the frequency of said error signal and wherein said error signal is based on a difference between a reference signal having a frequency substantially equal to said frequency of said error signal and a feedback signal corresponding to an output signal of said low pass filter.

2. The ring signal generator of claim 1, further comprising a first differential amplifier connected so as to receive said reference signal and said feedback signal and so as to output said error signal.

3. The ring signal generator of claim 2, further comprising a second differential amplifier connected so as to receive said output signal and a DC signal and so as to output said feedback signal.

4. The ring signal generator of claim 1, further comprising:
   a first generator for generating said reference signal; and
   a second generator for generating said second signal.

5. The ring signal generator of claim 1, wherein said error signal comprises first and second error signals and wherein said ring signal generator further comprises a voltage divider network connected so as to receive said error signal and so as to output said first and second error signals to said first and second comparators, respectively.

6. The ring signal generator of claim 1, wherein said low pass filter comprises an inductance-capacitance network.

7. The ring signal generator of claim 1, further comprising:
   first and second logical elements serially connected between respective ones of said first and second comparators and said first and second opto-isolators; and
   a control circuit operatively coupled to said first and second logical elements so as to permit at least one control signal produced by said control circuit to prevent application of at least one of said first and second pulse modulated signals to said first and second opto-isolators.

8. The ring signal generator of claim 7, wherein said first and second logical elements are NAND gates.

9. The ring signal generator of claim 1, wherein said first and second switch elements are high voltage MOSFET transistors.

10. A ring signal generator producing a high voltage sinusoidal waveform at a first predetermined frequency from first and second rails providing high DC voltages of opposite polarity, said ring signal generator comprising:
    a pulse width modulation circuit connected to receive an error corrected reference signal, which is based on a reference signal and an output signal, and a second signal having a frequency significantly higher than a frequency of said error corrected reference signal for generating first and second pulse modulated signals, said first pulse modulated signal being generated when the amplitude of said error corrected reference signal is greater than said second signal and said second pulse modulated signal being generated when said the amplitude of said second signal is greater than the amplitude of said error corrected reference signal;
    first and second transistors;
    first and second opto-isolators serially coupled to said pulse width modulation circuit and respective gates of said first and second transistors so as to permit said first and second pulse modulated signals to be applied to said first and second transistors, respectively; and
    a filter;
    wherein source terminals of said first and second transistors are connected to respective ones of the first and second rails and drain terminals of said first and second transistors are connected to an input terminal of said filter network;
    wherein said first and second transistors generate an unfiltered output signal at a second predetermined frequency responsive to application of said first and second pulse modulated signals to respective gates of said first and second transistors;
    and wherein said filter network generates said output signal responsive to said unfiltered output signal.

11. The ring signal generator of claim 10, further comprising:
    a first differential amplifier connected so as to receive said output signal and a DC signal corresponding to a DC voltage for generating a feedback signal; and a second differential amplifier connected so as to receive said feedback signal and said reference signal for generating said error corrected reference signal.

12. The ring signal generator of claim 10, further comprising:
   a first generator for generating said reference signal; and
   a second generator for generating said second signal.

13. The ring signal generator of claim 10, wherein said pulse width modulation circuit comprises first and second comparators.

14. The ring signal generator of claim 13, wherein said error corrected reference signal comprises first and second error corrected reference signals and wherein said ring signal generator further comprises a voltage divider network connected so as to receive said error corrected reference signal and so as to output said first and second error corrected reference signals to said first and second comparators, respectively.

15. The ring signal generator of claim 10, wherein said pulse width modulation circuit comprises:
   a voltage divider network having an input terminal connected to receive said error corrected reference signal and generating first and second error corrected reference signals at respective first and second output terminals; and
   first and second comparators having respective first and second input terminals;
   wherein said first and second input terminals of said first comparator respectively receive said first error corrected reference signal and said second signal; and
   wherein said first and second input terminals of said second comparator respectively receive said second signal and said second error corrected reference signal.

16. The ring signal generator of claim 15, further comprising:
   first and second logical elements serially connected between respective ones of said first and second comparators and said first and second opto-isolators; and
   a control circuit operatively coupled to said first and second logical elements so as to permit at least one control signal generated by said control circuit to prevent application of at least one of said first and second pulse modulated signals to said first and second opto-isolators.

17. The ring signal generator of claim 16, wherein said first and second logical elements are NAND gates.

18. The ring signal generator of claim 10, wherein said first and second transistors are high voltage MOSFET transistors.

19. A ring signal generator producing a high voltage sinusoidal waveform at a first predetermined frequency from first and second rails providing high DC voltages of opposite polarity, said ring signal generator comprising:
   a pulse width modulation circuit connected to receive an error corrected reference signal, which is based on a reference signal and an output signal, and a second signal having a frequency significantly higher than a frequency of said error corrected reference signal and to generate first and second pulse modulated signals, said first pulse modulated signal being generated when the amplitude of said error corrected reference signal is greater than said second signal and said second pulse modulated signal being generated when said the amplitude of said second signal is greater than the amplitude of said error corrected reference signal, said pulse width modulation circuit comprising:
   a voltage divider having an input terminal connected to receive said error corrected reference signal for generating first and second error corrected reference signals at respective first and second output terminals;
   first and second comparators having respective first and second input terminals and an output terminal;
   first and second transistors;
   first and second opto-isolators serially coupled to respective output terminals of said first and second comparators and respective gates of said first and second transistors so as to permit said first and second pulse modulated signals to be applied to said first and second transistors, respectively; and
   first and second logical elements serially connected between an output terminal of said first and second comparators and said first and second opto-isolators, respectively;
   a control circuit operatively coupled to said first and second logical elements for permitting at least one control signal generated by said control circuit to prevent application of said at least one of first and second pulse modulated signals to said first and second opto-isolators;
   a filter;
   wherein said first and second input terminals of said first comparator respectively receives said first error corrected reference signal and said second signal and said first and second input terminals of said second comparator respectively receive said second signal and said second error corrected reference signal;
   wherein source terminals of said first and second transistors are connected to respective ones of the first and second rails and drain terminals of said first and second transistors are connected to an input terminal of said filter;
   wherein said first and second transistors generate an unfiltered output signal at a second predetermined frequency responsive to application of said first and second pulse modulated signals to respective gates of said first and second transistors; and
   wherein said filter generates said output signal responsive to said unfiltered output signal.

20. The ring signal generator of claim 19, wherein said first and second transistors are high voltage MOSFET transistors.

* * * * *